(12) United States Patent
Borkenhagen et al.

(10) Patent No.: US 7,392,445 B2
(45) Date of Patent: Jun. 24, 2008

(54) AUTONOMIC BUS RECONFIGURATION FOR FAULT CONDITIONS

(75) Inventors: John Michael Borkenhagen, Rochester, MN (US); Laura Marie Zumbrunnen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 10/660,217

(22) Filed: Sep. 11, 2003

(65) Prior Publication Data

US 2005/0058086 A1 Mar. 17, 2005

(51) Int. Cl.
*G01R 31/28* (2006.01)
(52) U.S. Cl. .................. 714/724; 370/257; 370/216; 370/228; 714/746; 714/7; 714/48; 714/57; 714/15; 340/825
(58) Field of Classification Search ............... None
See application file for complete search history.

(56) References Cited

U.S. PATENT DOCUMENTS

| | | | | |
|---|---|---|---|---|
| 4,365,248 A | * | 12/1982 | Bargeton et al. ....... | 340/825.01 |
| 5,226,037 A | * | 7/1993 | Satomi et al. ............ | 370/220 |
| 5,440,538 A | * | 8/1995 | Olsen .................. | 370/228 |
| 5,678,065 A | | 10/1997 | Lee et al. | |
| 5,717,852 A | | 2/1998 | Izuno et al. | |
| 5,815,734 A | | 9/1998 | Lee et al. | |
| 5,935,208 A | | 8/1999 | Duckwall et al. | |
| 6,018,810 A | | 1/2000 | Olarig | |
| 6,366,557 B1 | * | 4/2002 | Hunter ................ | 370/217 |
| 6,397,277 B1 | | 5/2002 | Kato et al. | |
| 6,574,753 B1 | * | 6/2003 | Haynes et al. ........... | 714/43 |
| 6,898,730 B1 | * | 5/2005 | Hanan ................ | 714/7 |
| 7,100,071 B2 | * | 8/2006 | Olarig ................. | 714/5 |
| 7,194,581 B2 | * | 3/2007 | Vogt .................. | 711/131 |
| 2003/0012528 A1 | * | 1/2003 | Linnell ............... | 385/101 |
| 2003/0131192 A1 | * | 7/2003 | Nakamura et al. ........ | 711/114 |
| 2003/0192000 A1 | * | 10/2003 | Vail et al. ............ | 714/746 |
| 2004/0136319 A1 | * | 7/2004 | Becker et al. .......... | 370/225 |
| 2004/0199840 A1 | * | 10/2004 | Takeoka et al. ......... | 714/727 |

FOREIGN PATENT DOCUMENTS

EP 0836141 A 4/1998

\* cited by examiner

*Primary Examiner*—Jacques Louis-Jacques
*Assistant Examiner*—Guerrier Merant
(74) *Attorney, Agent, or Firm*—Robert R. Williams

(57) ABSTRACT

Methods and apparatus are provided that allow an electronic system having a signaling bus with a fault on a signaling conductor to operate at a degraded performance. A block of data is transferred from a first electronic unit to a second electronic unit over the signaling bus. A transmission sequence sends the block of data using all of the nonfaulty signaling conductors using a minimum number of beats required to complete the transmission.

5 Claims, 14 Drawing Sheets

| | | | | | | | | |
|---|---|---|---|---|---|---|---|---|
| PRE BEAT 1 | | | | | | | | |
| PRE BEAT 2 | | | | | | | | BYTE 0 BIT Z |
| PRE BEAT 3 | | | | | | | BYTE 0 BIT Z | BYTE 1 BIT Z |
| PRE BEAT 4 | | | | | | BYTE 0 BIT Z | BYTE 1 BIT Z | BYTE 2 BIT Z |
| PRE BEAT 5 | | | | | BYTE 0 BIT Z | BYTE 1 BIT Z | BYTE 2 BIT Z | BYTE 3 BIT Z |
| PRE BEAT 6 | | | | BYTE 0 BIT Z | BYTE 1 BIT Z | BYTE 2 BIT Z | BYTE 3 BIT Z | BYTE 4 BIT Z |
| PRE BEAT 7 | | | BYTE 0 BIT Z | BYTE 1 BIT Z | BYTE 2 BIT Z | BYTE 3 BIT Z | BYTE 4 BIT Z | BYTE 5 BIT Z |
| PRE BEAT 8 | | BYTE 0 BIT Z | BYTE 1 BIT Z | BYTE 2 BIT Z | BYTE 3 BIT Z | BYTE 4 BIT Z | BYTE 5 BIT Z | BYTE 6 BIT Z |
| PRE BEAT 9 | BYTE 0 BIT Z | BYTE 1 BIT Z | BYTE 2 BIT Z | BYTE 3 BIT Z | BYTE 4 BIT Z | BYTE 5 BIT Z | BYTE 6 BIT Z | BYTE 7 BIT Z |
| PRE BEAT 10 | BYTE 1 BIT Z | BYTE 2 BIT Z | BYTE 3 BIT Z | BYTE 4 BIT Z | BYTE 5 BIT Z | BYTE 6 BIT Z | BYTE 7 BIT Z | BYTE 0 BIT Z |

Fig. 4

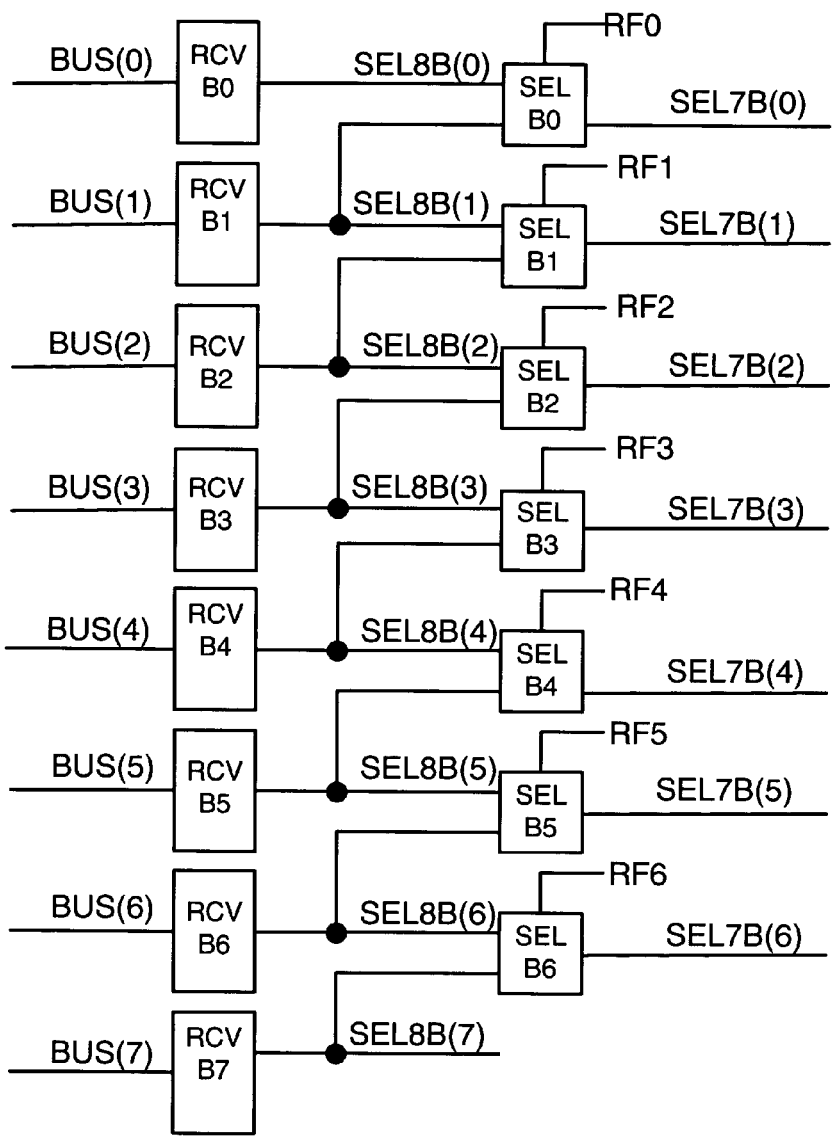
Fig. 10
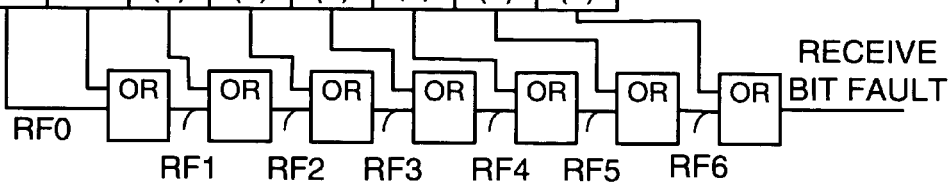

AUTONOMIC BUS RECONFIGURATION FOR FAULT CONDITIONS

BACKGROUND OF THE INVENTION

1. Field of the Invention

The present invention generally relates to electronic systems having components coupled by signaling busses. More specifically, the present invention relates to signaling busses having a fault on one or more signaling conductors in a signaling bus.

2. Description of the Related Art

Electronic systems generally comprise multiple electronic units that are interconnected by signaling conductors. These signaling conductors typically are electrically conducting paths made of copper, aluminum, or other such material. Alternatively, optical fibers also conduct signals.

For example, semiconductor chips drive and receive signals which are electrically coupled to signal conductors on modules using wirebond or flip chip techniques. The modules are typically further coupled to printed wiring board (PWB) signal conductors using copper pins, solder columns, or other means. The signal conductors on PWBs interconnect one module with another, as well as route signals to PWB edge connectors or cable connectors. PWB edge connectors and cable connectors are used to interconnect one PWB with another PWB using a backplane or cables. Even within a semiconductor chip, extremely fine electrical conductors route signals between circuits and logical units on the chip.

A group of logically related signaling conductors is called a signaling bus. For example, a processor chip is connected to a memory control chip by a signaling bus having a specified number of signaling conductors over which data flows substantially in parallel. That is, if the processor chip is coupled to the memory control with an eight bit bus, the processor chip sends eight bits of data (a byte) at substantially the same time, one bit on each of the signaling conductors of the signaling bus. For example, the processor chip transmits an address to the memory control chip of the example a byte at a time, and receives data back from the memory control chip a byte at a time.

Economic and physical factors limit the number of signaling conductors that can be used to interconnect electronic elements. Each interconnect between a module and a card, for example, costs approximately a penny. Large numbers of interconnects on highly price sensitive electronic units is not justified. Furthermore, as many components are mounted on a PWB, large numbers of interconnects force additional wiring layers in the PWB, raising the cost of the PWB. Cabling between electronic units becomes very expensive when many interconnects are used, and thick, many-conductor cables are awkward to handle, costly, and troublesome from a reliability standpoint. At a certain point, it becomes not only costly and not reliable, but physically impossible to add more interconnects.

Typically, one electronic unit must transmit a block of data to another electronic unit. The block of data often is relatively large. For example, cache lines in some modern computer systems are 64 bytes or 128 bytes long. If this block (i.e., a cache line) is to be sent over an eight byte signaling bus, eight or 16 bus cycles (beats), respectively, are required to complete the transfer. In many applications, even larger blocks of data are transferred over signaling busses having even fewer signaling conductors.

Today's electronic systems are expected to operate reliably. Downtime on commercial computer systems relied upon to operate a business can cost enormous dollar amounts from loss of sales. In addition, such downtime can frustrate customers, causing them to turn to a competitor. Many commercial systems are counted on to run 24/7 (i.e., continuously). Unexpected failures causing outages at peak use are very serious problems. Users of such commercial systems typically prefer continued operation, even at a slightly degraded performance, if a failure occurs. Users can then plan for correcting the failure at a more convenient time. Military systems also rely heavily on electronic systems and are further subject to rough use and severe environments. A total failure of an electronic system in a combat environment is likely to result in severe consequences to the user. Spare parts (new cables, new PWBs, etc) may not be available in a combat situation. Continued operation at a slightly degraded performance is therefore preferable in many military applications.

Signaling busses have one or more signaling conductors associated with the signaling bus, typically, signaling busses have multiples of eight signaling conductors. Often, a single extra signaling conductor carries a parity bit. For example, a signaling bus having eight signaling conductors also has a ninth (parity) signaling conductor that carries parity. A parity generator on the sending unit produces a logical value on the parity such that the number of logical "1"s on the bus is always odd (or, in another embodiment, is always even). A parity checker on the receiving unit checks whether the received number of logical "1"s (that is, "odd" or "even") is as expected. Such a parity generation/checking system can detect a single fault on the signaling bus but cannot correct the fault. When a parity error is detected, the signaling bus can no longer be used to transmit data. Additional signaling conductors can be used to implement "error correction codes" (ECC), which, in many applications can correct a single fault and detect two faults. Use of ECC incurs additional cost associated with the additional signaling conductors. Cyclical Redundancy Code (CRC) use is yet another technique used to find and accommodate errors in transmitting data.

Many modern electronic systems have the capability of performing "wire test" procedures to determine details on faults in signaling busses. For example, a first electronic unit drives a predetermined pattern of logical "1"s and "0"s on a signaling conductor. A second electronic unit coupled to the first by the signaling conductor receives data from the signaling conductor and compares the received pattern against the predetermined pattern. If the received pattern is not the same as the predetermined pattern, the signaling conductor, the driver, or the receiver, is faulty. Such a path would make a signaling bus with or without parity unusable. Even a signaling bus employing ECC having single error correct, double error detect would be in jeopardy, since another failure in an ECC bus would make even the ECC bus unusable. Faults in two signaling conductors would make even a signaling bus having ECC with single bit correct unusable.

Therefore, a need exists to provide method and apparatus that allow a signaling bus having a faulty signaling conductor to operate at a slightly degraded performance.

SUMMARY OF THE INVENTION

The present invention generally provides methods and apparatus to allow continued, but degraded, operation of an electronic system having a first electronic unit coupled to a second electronic unit by a signaling bus, where a signaling conductor in the signaling bus is faulty. Nonfaulty signaling conductors in the signaling bus are identified, and the first electronic unit transmits the block of data in a transmission sequence utilizing all the nonfaulty signaling conductors, to the second electronic unit, using a minimum number of beats (bus cycles) to complete the transmission. The first electronic unit is designed to transmit a block of data having "J" bits over the signaling bus having "K" signaling conductors. The second electronic unit receives the block of data. The electronic system uses "wire test" or other means to identify a faulty and nonfaulty signaling conductor in the signaling bus and stores the identity of the faulty signaling conductor or conductors in the first electronic unit and the second electronic unit. "F" is the number of faulty conductors in the signaling bus. The first electronic unit uses the identity of the faulty signaling conductors to alter its transmission, sending the "J" bit blocks over the remaining "K-F" signaling conductors as a transmission sequence, using one or more additional beats to accomplish the transmission. The second electronic unit uses the identity of the faulty signaling conductor to receive the "J" bit blocks over the nonfaulty "K-F" signaling conductors according to the transmission sequence.

In an embodiment, in an electronic system needing to transmit a block of data comprising "J" bits over a signaling bus comprising "K" signaling conductors, "J/K" bus cycles (beats) are used in a transmission sequence to complete the transfer when no signaling conductor is faulty. When "F" signaling conductors in the signaling bus are faulty, the number of beats required by the transmission sequence is "J/(K-F)", plus one more beat if the division leaves a remainder.

In an embodiment having a signaling bus having "K" signaling conductors, "F" of which are faulty, a transmission sequence selects "K" bits per beat from the block of data comprising "J" bits of data. "K-F" bits are transmitted for each of "J/K" beats, with F bits stored per beat for subsequent transmission. "J/(K-F)-J/K" additional beats (plus one more beat if the division leaves a remainder) are used to transmit the stored bit(s) from each beat that were not sent during the "J/K" beats.

In an embodiment having a signaling bus having "K" signaling conductors, "F" of which is faulty, a transmission sequence selects "K-F" bits per beat from the block of data in the first electronic unit comprising "J" bits of data. "K-F" bits are transmitted for each of J/(K-F) beats. One more beat is used if the division leaves a remainder).

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 shows the contents of a driving bit register block depicted in FIG. 3 as beats of data are sent over the signaling bus having a faulty signaling conductor.

FIG. 10 shows a detailed block diagram of a receiver control block depicted in FIG. 7.

DETAILED DESCRIPTION OF THE PREFERRED EMBODIMENTS

Having reference now to the figures, and having provided above a discussion of the art, the present invention will be described in detail.

The present invention generally provides methods and apparatus to allow continued, but degraded, operation of an electronic system having a first electronic unit coupled to a second electronic unit by a signaling bus, where a signaling conductor in the signaling bus is faulty. Nonfaulty signaling conductors in the signaling bus are identified, and the first electronic unit transmits the block of data in a transmission sequence utilizing all the nonfaulty signaling conductors, to the second electronic unit, using a minimum number of beats (bus cycles) to complete the transmission. The first electronic unit is designed to transmit blocks of data having "J" bits over the signaling bus having "K" signaling conductors. The second electronic unit receives the blocks of data. The electronic system uses "wire test" or other means to identify a faulty signaling conductor in the signaling bus and stores the identity of the faulty signaling conductor in the first electronic unit and the second electronic unit. The number of faulty signaling conductors is "F". The first electronic unit uses the identity of the faulty signaling conductor to alter its transmission, sending the "J" bit blocks over the nonfaulty "K-F" signaling conductors, using one or more additional beats to accomplish the transmission. The second electronic unit uses the identity of the faulty signaling conductor to receive the "J" bit blocks over the nonfaulty "K-F" signaling conductors. Although "F" can, in general, be any number up to "K-1", for simplicity, a single fault is assumed in the following examples. In addition, for simplicity, the following examples assume an eight bit signaling bus over which a 64-bit block of data is transferred.

Figure 1:
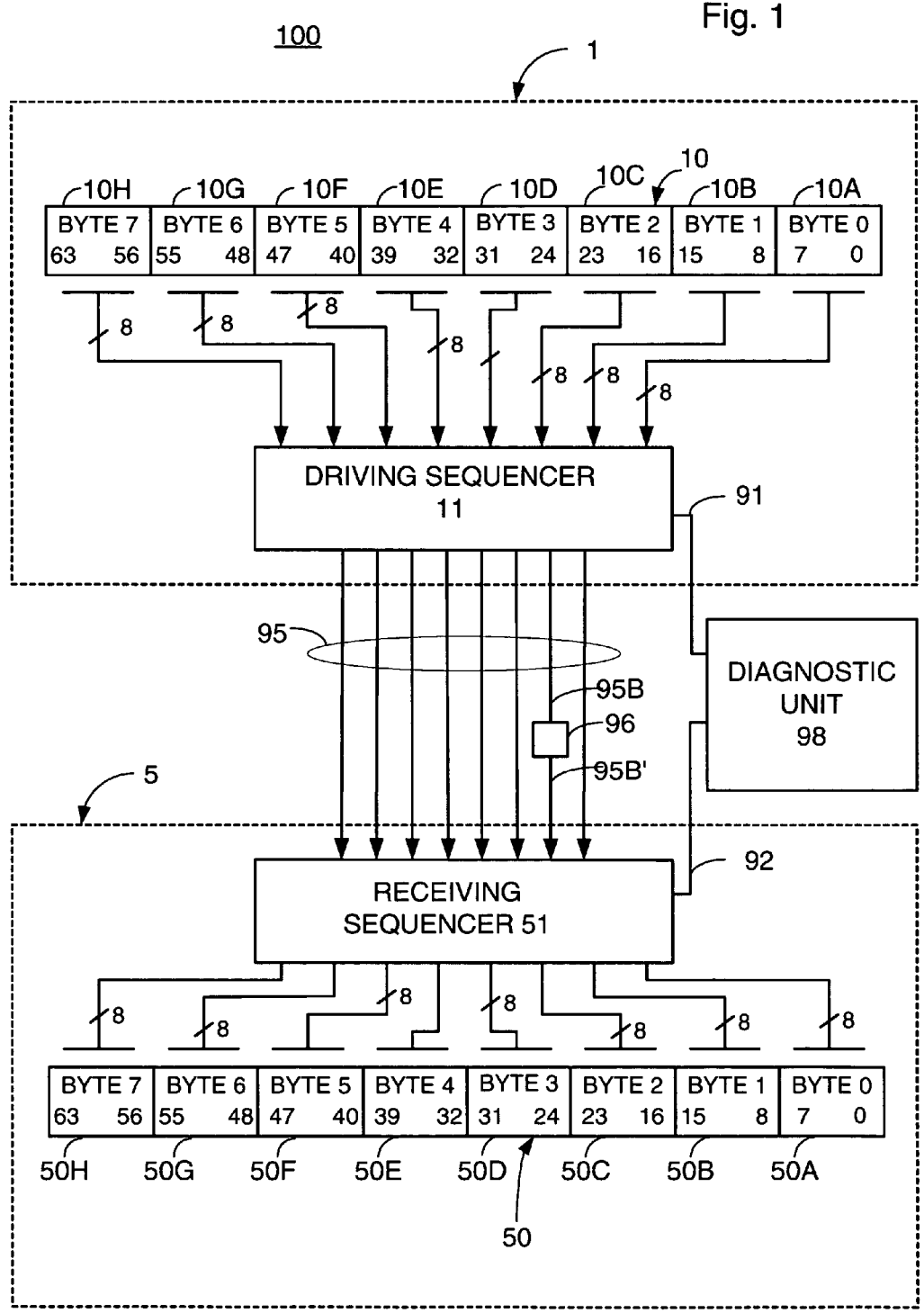
FIG. 1 shows a high level block diagram with two electronic units coupled by a signaling bus. Each electronic unit has storage for a block of data. An exemplary fault is shown on one signaling conductor of the signaling bus.

FIG. 1 shows a high level block diagram of an electronic system generally denoted as 100. Electronic system 100 comprises a first electronic unit 1, hereinafter called chip 1, and a second electronic unit 5, hereinafter called chip 5. Electronic unit 1 and electronic unit 5 can be any electronic component, including but not limited to semiconductor chips, modules, printed wiring boards (PWBs), or electronic enclosures. "Chip" is used to provide a concrete example for explanation. Chip 1 contains a first block of data 10 that must be driven, using a transmission sequence defining a number of bits to be transmitted on each beat (bus cycle) and how many beats are required to complete the transmission, to chip 5 where it will be stored in a second block of data 50. After a successful transfer, second block of data 50 is the same as as first block of data 10 prior to initiation of transmission. First block of data 10 and second block of data 50 are generally stored in a register or registers on each chip, but may be in any form of storage, such as cache or other memory. Data from first block of data 10 is transferred from chip 1 to chip 5 over signaling bus 95. First block of data in the example of FIG. 1 contains eight bytes (i.e., 64 bits). Signaling bus 95 is shown, in FIG. 1, to have eight signaling conductors. Because of economic and physical considerations discussed earlier, signaling busses are typically "narrow" (that is, have relatively few signaling conductors), much narrower than the number of bits in the block of data that is transferred. Although signaling bus 95 is shown to have eight signaling conductors for exemplary purposes, wider or narrower signaling busses are contemplated, and the signaling busses may further embody parity, or error correcting code signaling conductors. In absence of faults on the signaling conductors (including driver or receiver faults), all the data in first block of data 10 is transferred to chip 5 using eight signaling bus cycles (beats). A select group of eight bits of information (a byte) is transmitted during each beat. The select group is a group of bits selected from first block of data 10 (or from other storage as will be discussed below) for routing to inputs of drivers that drive signaling bus 95. Bytes 0-7, shown as 10A-10H in FIG. 1, are selected in a predetermined order, sequentially in turn, in the example, from block of data 10, and are transmitted, one byte at a time, over signaling bus 95. Chip 5 receives each byte and stores each byte into bytes 0-7, shown as 50A-50H, of second block of data 50.

Although first block of data 10 and second block of data 50 are shown having a byte wide bus coupling each byte of data in first block of data 10 and second block of data 50 to driving sequencer 11 and receiving sequencer 51 respectively, other implementations are contemplated. In an embodiment (not shown), first block of data 50, for example, is a shift register, where data is shifted eight bits of a time, and only a single byte of the shift register is coupled to driving sequencer 11. In yet another embodiment (not shown), first block of data 10 is a register stack of eight eight-bit registers; the register stack having an associated three-bit address capable of addressing any of the registers in the stack. Similar embodiments are contemplated for second block of data 50 in chip 5.

FIG. 1 shows a fault 96 in one of the signaling conductors of signaling bus 95. Fault 96 separates signaling conductor portion 95B from signaling conductor portion 95B'. Fault 96 can be a discontinuity, or break, in the signaling conductor, sometimes referred to as an "open circuit". Fault 96 can also be an unwanted connection to a voltage supply. In either case, the signaling conductor consisting of portions 95B and 95B' cannot reliably transmit information. Fault 96 could also be a short circuit between two signals on signaling bus 95, however, signaling bus 95 would then have two faults, and the current example assumes a single fault. Additional logic blocks, beyond those shown in the exemplary figures, are required to accommodate two faults. The additional logic, however, is similar to the logic shown, as will be appreciated by those skilled in the art.

During a "wire test" during system bringup or performed respondent to a parity check, CRC, or ECC error, a fault is identified and stored in diagnostic unit 98. Communication of the fault is communicated via signaling conductors 91 and signaling conductors 92. Signaling conductors 91 and 92 may be a single signaling conductor or may be busses having a plurality of signaling conductors. The diagnostic unit 98 is any unit that examines an electronic system for faults. For example, in the IBM iSeries computers, the diagnostic unit is called a "service processor".

Figure 2A:
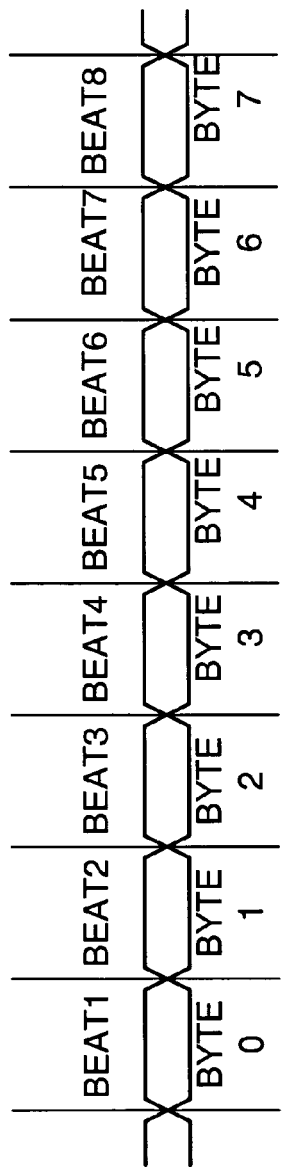
FIGS. 2A and 2B show, respectively, timing diagrams and a description of data sent on each beat, for a signaling bus with no fault, and the signaling bus with a faulty signaling conductor.

FIG. 2A shows a transmission sequence performed during normal transfer of data in first block of data 10 over signaling bus 95 when signaling bus 95 has no fault. During a first beat, byte 0 is transferred. During a second beat, byte 1 is transferred. The last byte, byte 7, is transferred on an eighth beat.

Figure 2B:
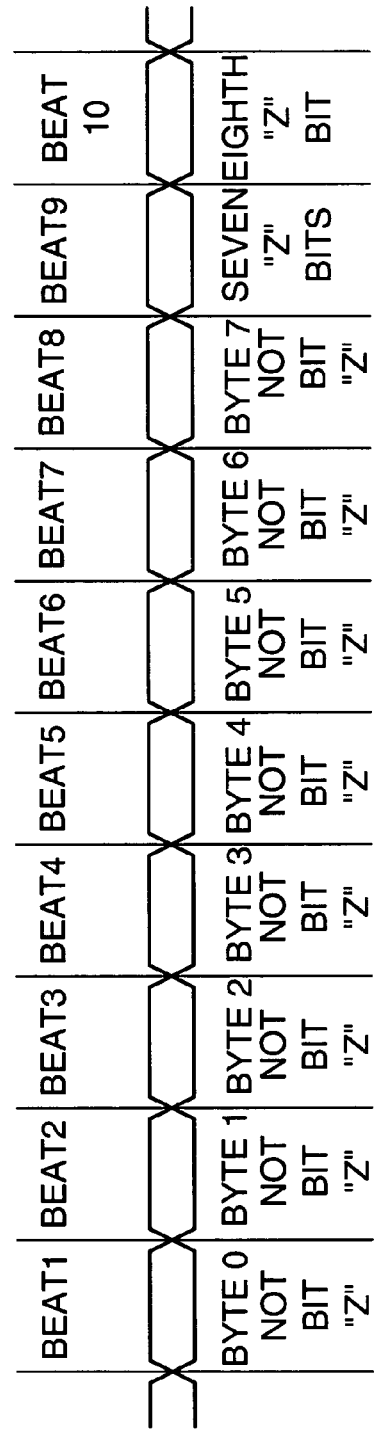

FIG. 2B shows a transmission sequence accomplishing transfer of data in first block of data 10 over signaling bus 95 when one of the signaling conductors in signaling bus 95 has a fault. For exemplary purposes, the bit on signaling conductor "Z" of signaling bus 95 cannot be transferred due to the fault. Driving sequencer 11 of chip 1 is aware of the fault but selects a select group of one byte (in the example) for each of the first eight beats of data transfer. This is similar to the operation when no fault exists. FIG. 2B notes that bit "Z" of each beat is not transferred. (e.g., byte 0 not bit "Z" means that byte 0 was routed to a driver's data input during beat 1, but bit "Z" of byte 0 was not transferred due to fault 96 on signaling conductor "Z". Advantageously, the driver of bit "Z" is placed in a nonconducting state (often called "disabled" or "tristated"), since the identified fault might be a short circuit, and large amounts of power might be dissipated if the fault is a short circuit to a ground voltage supply, and the particular bit is a logical "1". Driving sequencer 11 (see FIG. 1) stores the eight bits not sent during the first eight beats, storing bit "Z" for each beat. During a ninth beat, a select group comprising the eight "Z" bits that were stored is routed to the drivers. Seven of the "Z" bits are transferred. The eighth "Z" bit cannot be transferred on the ninth beat because of the fault. The eighth "Z" bit is then transferred on the tenth beat, using a nonfaulty signaling conductor in signaling bus 95.

The number of bits in block of data 10 (64 bits) and the number of signaling conductors in signaling bus 95 (eight) are exemplary values only, and any sized block of data and any number of signaling conductors in the bus are contemplated. Furthermore, in some electronic systems, the block of data may be variable, with a "header" sent prior to transmission of a data portion of the block of data, the header containing information regarding the size of the block to be transmitted. The header is to be considered, for purposes of this discussion, as a part of the block of data.

Figure 3:
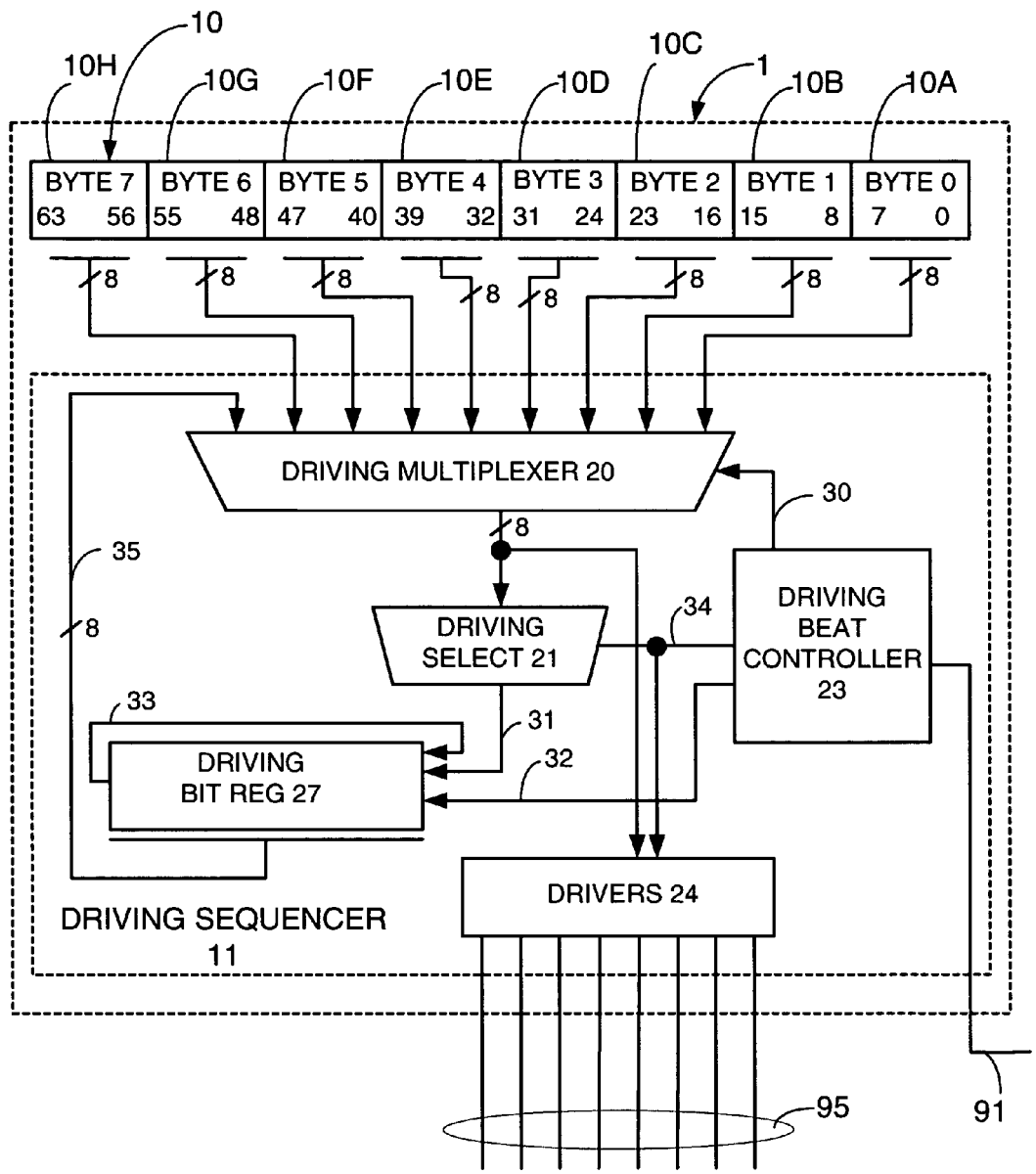
FIG. 3 shows a detailed block diagram of the electronic unit that drives a block of data over the signaling bus. An expanded block diagram of a driving sequencer is shown.

FIG. 3 shows chip 1, with a detailed block diagram of driving sequencer 11. Driving multiplexer 20 is coupled to each of the eight bytes of first block of data 10 and can select any of the eight bytes of first block of data 10 to an output of driving multiplexer 20. Driving multiplexer 20 is also coupled to driving bit register 27 by coupling 35. Driving beat controller 23 is coupled to driving multiplexer 20 by signal 30 which determines which of the nine bytes (i.e., eight bytes from first block of data 10, and the byte from driving register 27) will be selected by driving multiplexer 20. The selected byte is coupled to data inputs of drivers 24. The selected byte is also coupled to driving select 21. Signal 34 from driving beat controller 23 tells driving select 21 which signaling conductor in signaling bus 95 is faulty. This is the bit in the current byte selected, as explained above, that must be stored in driving bit register 27 for later transmission because of a fault 96 on a signal conductor in signaling bus 95. The selected bit is coupled to driving bit register 27 and is stored into driving bit register 27 as controlled by signal 32 from driving beat controller 23. Advantageously, driving bit register 27 is a shift register, although other embodiments are contemplated. After eight beats, driving bit register 27 contains all eight bits (one bit from each of bytes 0-7) that could not be transmitted because of fault 96. On the ninth beat, the eight bits in driving bit register 27 are selected by driving multiplexer 20 by signal 30 under control of driving beat controller 23. Seven of these eight bits are again transmitted over signaling bus 95. One bit still cannot be sent because of fault 96. Driving beat controller 23 further signals driving bit register 27 via coupling 32 to do a "rotate" of the bits in driving bit register 27. In FIG. 3, signal 33 couples a first end of driving bit register 27 to a second end of driving bit register 27. During the rotate, the rightmost seven bits in driving bit register 27 are shifted left by one bit position, and the leftmost bit is rotated to become the rightmost bit. During a tenth beat, the now-rotated contents of driving bit register 27 are again selected by driving multiplexer 20 under control of driving beat controller 23. Again, seven bits are transmitted over signaling bus 95, and one bit is not transmitted because of fault 96 of the example. However, because of the rotate operation on driving bit register 27, the bit that was not sent on the ninth beat is driven over a different signaling conductor and is successfully transmitted on the tenth beat. If the electronic system is designed to support more than a single faulty signaling conductor, driving bit register 27 is replicated (not shown) to hold the additional bits that cannot be transferred on a particular beat, with driving select 21 designed to select additional bits from the output of driving multiplexer 20 and store the additional bits into the replicas of driving bit register 27. Although a "rotate" operation in driving bit register 27 was described for exemplary purposes, any predetermined movement of bits in driving register 27 suitable to move the bit that could not be transmitted to be routed to a nonfaulty signaling conductor for the tenth beat is contemplated. In another embodiment (not shown), driving multiplexer 20 has a ninth input byte coupled to driving bit register 27 as described above, but in addition has a tenth input byte coupled to the bits of driving bit register 27, with bits of driving bit register 27 coupled in a predetermined order different than the ninth byte coupling of driving bit register 27 to driving multiplexer 20. Driving beat controller 23 would control driving multiplexer 20 to select the ninth input byte coupling during the ninth beat and the tenth input byte coupling during the tenth beat.

FIG. 4 shows the contents of driving bit register 27 prior to each beat. Bit "Z" is the bit of data that would be driven on the signaling conductor in signaling bus 95 having the fault. Prior to beat 1, no bits have been shifted into driving bit register 27. During beat 1, bit "Z" of byte 0 is shifted into the rightmost bit position of driving bit register 27. During beat 2, bit "Z" of byte 1 is shifted into the rightmost position of driving bit register 27. After beat 8, (shown as pre beat 9 in FIG. 4), bit "Z" for each byte is stored in driving bit register 27. These eight bits are selected by driving multiplexer 20 during the ninth beat as described earlier. Following the ninth beat, a rotate operation is done on driving bit register 27 as described earlier, and the data selected for the tenth beat is shown as "pre beat 10" in FIG. 4. All "Z" bits remain in driving bit register 27, but are rotated by one bit position, and will therefore be routed to be driven on different signal conductors on signaling bus 95 by driver 24. Therefore, the "Z" bit which could not be transferred on the ninth beat is successfully transferred on the tenth beat.

Figure 5:
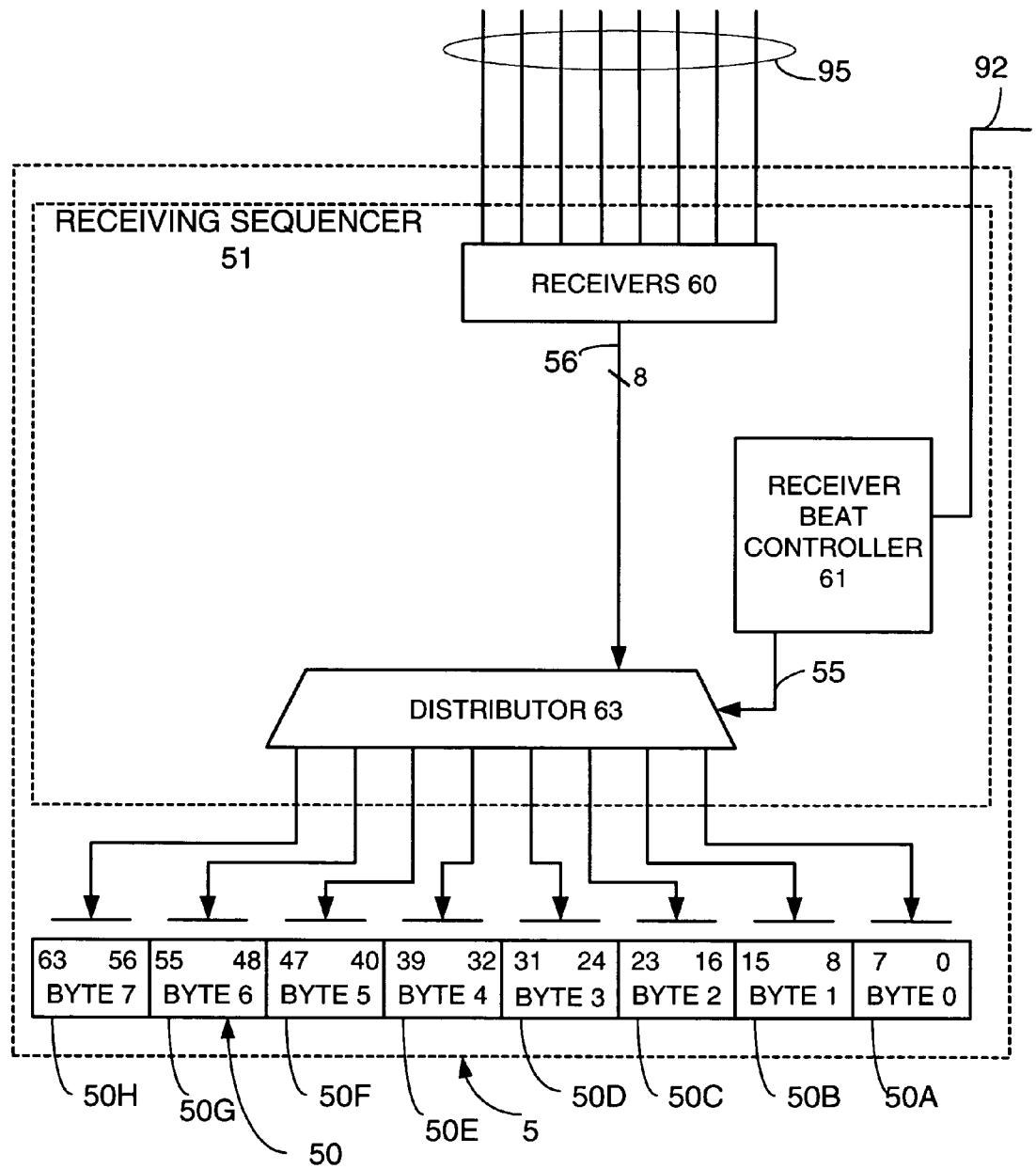
FIG. 5 shows an expanded block diagram of the electronic unit that receives the block of data sent by the driving electronic unit over the signaling bus having a faulty signaling conductor.

FIG. 5 shows an expanded block diagram of chip 5. Receiving sequencer 51 contains receivers 60 suitable to receive signals on signaling bus 95. Receiving sequencer 51 also has a receiver beat controller 61 that is coupled by signal 92 to diagnostic unit 98 which was described earlier. Receiver beat controller 61 is told by diagnostic unit 98 which, if any, signaling conductors in signaling bus 95 are faulty.

Distributor 63 is coupled to receivers 60 on internal bus 56 and receiver beat controller 61 by signal 55 (which may comprise multiple signals). Distributor 63 is capable of distributing signals output by receivers 60 to the appropriate bits in second block of data 50. In the absence of a fault, distributor 63 simply moves a byte of data from internal bus 56 to the appropriate byte of second block of data 50 during each of eight beats (in the example). When fault 96 exists on signaling conductor "Z" (according to the above discussion) exists, two additional beats (in the example) are required. During the ninth beat, internal bus 56 has seven valid bits and one invalid bit. On the ninth beat, each of the 8 bits on internal bus 56 is driven to the respective "Zth" bit in each of the bytes (i.e., bytes 0-7) of second block of data 50. After the ninth beat, second block of data 50 contains 63 valid bits and one invalid bit. During the tenth beat, internal bus 56 again has seven valid bits and one invalid bit. Six of the valid bits are simply data that was successfully written into second block of data 50 during the ninth beat. The seventh valid bit is directed during the tenth beat to the "Zth" bit of the byte containing the remaining invalid bit in second block of data 50. For example, if fault 96 exists on bit 2 of signaling bus 95, the bit written into second block of data 50 on the tenth beat is bit 2 of byte 2; however, data for this write is taken from bit 3 of signaling bus 95, since the data transmitted has been rotated by one bit in driving bit register 27 as explained above.

Figure 6:
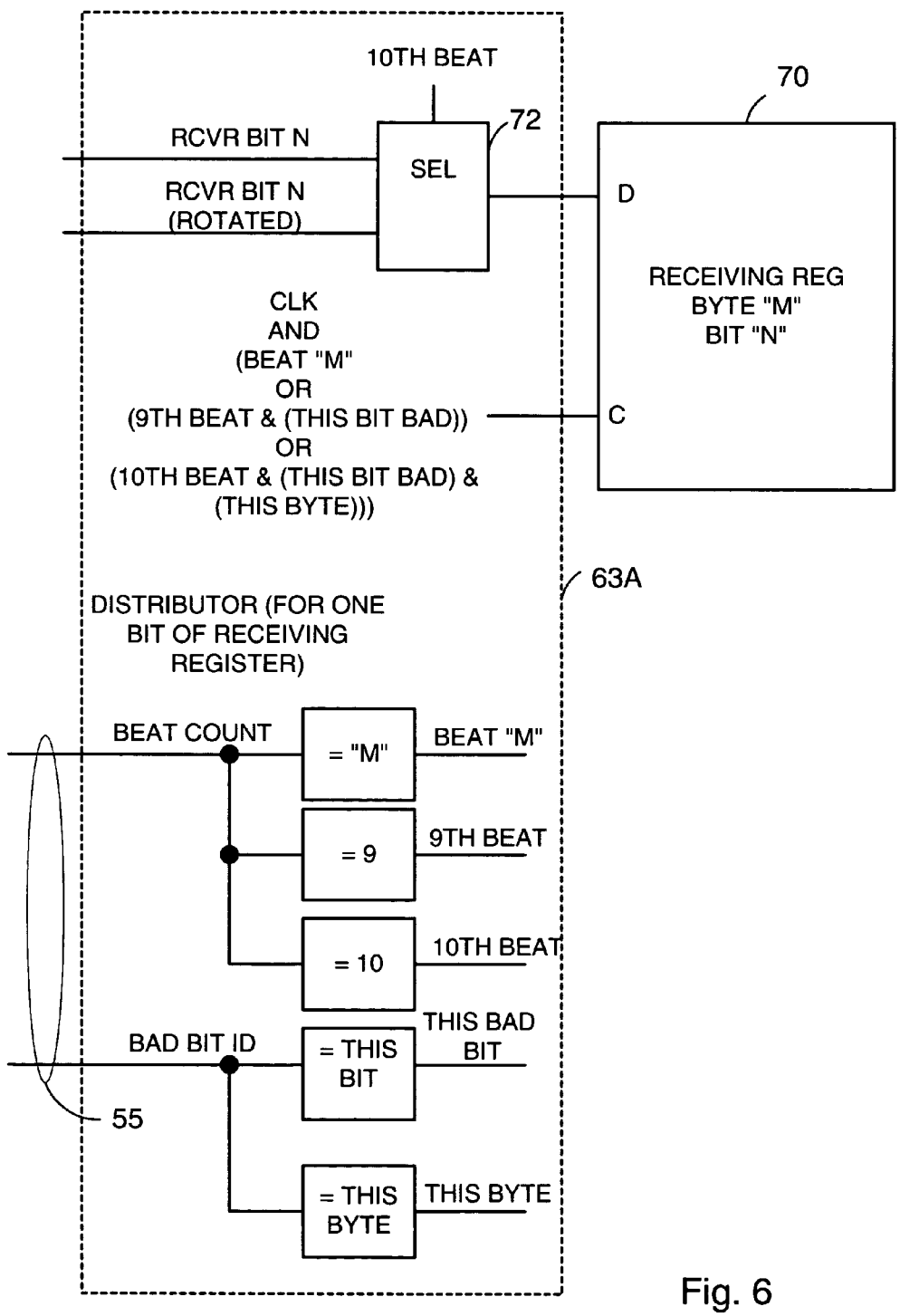
FIG. 6 shows details of a one-bit portion of a distributor block depicted in FIG. 5.

FIG. 6 shows in even more detail an exemplary set of logic 63A that performs the distributor function for one bit of distributor 63. Register bit 70 is one bit of second block of data 50; bit "N" of byte "M", in the example shown. A data input D of register bit 70 is coupled to selector 72, which selects "rcvr bit N", that is the "Nth" bit of internal bus 56, for any beat less than ten. On a tenth beat, "rcvr bit N (rotated)" is selected to account for the rotation of data performed by driving bit register 27 prior to transmission. Data on data input D of register bit 70 is clocked in by a signal on input C. "CLK" is the system clock which is gated according to the logical expression shown in FIG. 6. Register bit 70 will receive a clock when CLK is active and "beat M" is asserted. For example, all bits of byte 2 will be clocked in on the second beat. Register bit 70 will also receive a clock (during CLK active) during the ninth beat if bit "N" on signaling bus 95 is faulty. For example, if bit 2 of signaling bus 95 is faulty, and register bit 70 is bit 2 of any byte in second block of data 50, register bit 70 will be clocked. Register bit 70 will also be clocked (during CLK active) during the tenth beat if this is the final bit that must be written into second block of data 50. Continuing the example where bit 2 of signaling bus 95 is faulty, if register bit 70 represents bit 2 of byte 2, then register bit 70 will receive a clock on the tenth cycle. Distributor 63 receives information about which bit (if any) on signaling bus 95 is faulty, and what the current beat is.

Figure 7:
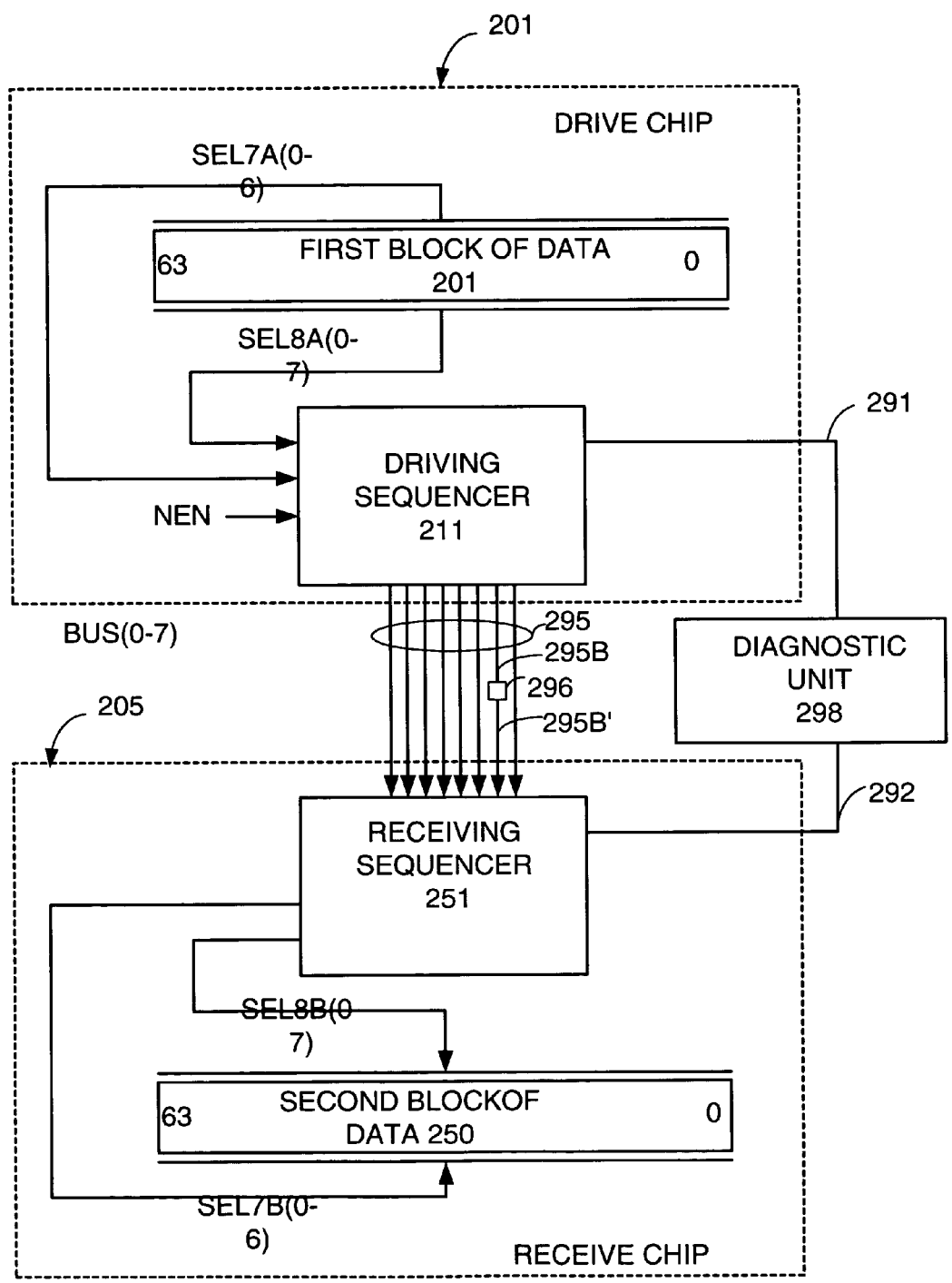
FIG. 7 shows a high level block diagram of a second embodiment of the invention. A driving electronic unit (drive chip in the exemplary drawing) is coupled to a second electronic unit (receive chip in the exemplary drawing) via a signaling bus having a faulty signaling conductor. Different sized groups of data are selected from the block of data to be transmitted depending on whether or not a faulty signaling conductor is identified.

FIG. 7 shows another embodiment of the present invention. This embodiment also provides the capability of continuing operation of an electronic system having a fault in a signaling conductor in a signaling bus, and, indeed, uses the same number of cycles as the previous embodiment under both operation with no fault and with a fault. This embodiment differs in the way the bits are selected, as will be explained below. The embodiment of FIG. 7 shows a diagnostic unit 298, which, like diagnostic unit 98 of FIG. 1, is capable of identifying faults on signaling busses and communicating the identity of the fault to a first electronic unit and a second electronic unit.

Chip 201 (as before, "chip" is used for exemplary purposes, in fact, chip 201 could be a module, a PWB, an electronic enclosure or any other electronic unit) needs to transfer a first block of data 201 to a second block of data 250 in chip 205. As with drive chip 201, receive chip 205 is intended to represent any electronic unit. In the example shown in FIG. 7, first block of data 201 has 64 bits (0-63), and second block of data 250 has 64 bits (0-63). First block of data 201 and second block of data 250 can physically reside in a register or registers, a cache, a shift register or any other means of storage. Signaling bus 295 has eight bits. A signaling conductor comprising first portion 295B and second portion 295B' is shown to have fault 296. Fault 296 can be an open circuit or a short circuit, either type of fault making the signaling conductor inoperative. As with fault 96 of FIG. 1, fault 296 could be a short between signal conductors of signaling bus 295, but the present example, for simplicity, discusses a single fault. Signal NEN is a "not enable" signal that is often used to logically disable (tristate) drivers on signaling bus 295. Although optional, it is shown to help explain how it is logically combined with other signals to disable all drivers on the entire signaling bus 295 or just a single driver coupled to a signaling conductor having a fault.

In absence of fault 296, driving sequencer 211 selects "nonfault select groups" of eight bits at a time from first block of data 201 over internal bus SEL8A(0-7) and drives the eight bits substantially in parallel over signaling bus 295 for each of eight beats. Receiving sequencer 251 receives eight bits of data from each beat and transfers the eight bits to appropriate bits in second block of data 250 over SEL8B(0-7). As before, driving sequencer 211 and receiving sequencer 251 are informed by diagnostic unit 298 of the existence and identity of a fault 296 in a signaling conductor via signals 291 and 292, respectively.

Figure 8A:
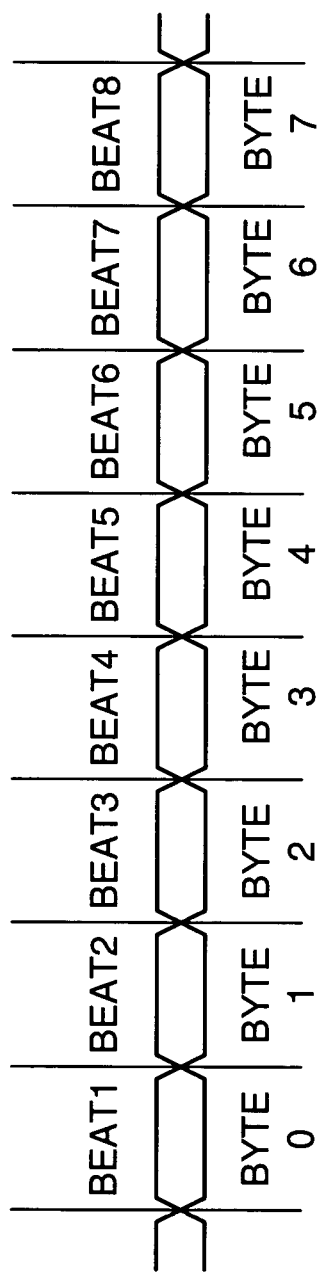
FIGS. 8A and 8B show timing diagrams for normal data transmission (i.e., no faulty signaling conductor has been identified), and for data transmission when a faulty signaling conductor has been identified.
Figure 8B:
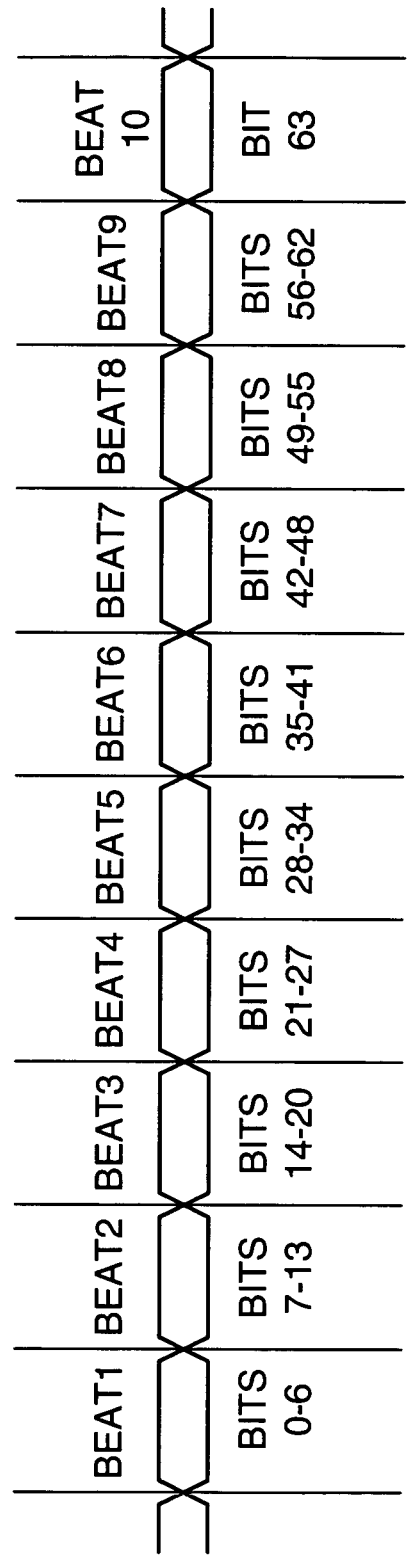

If a fault 296 exists, driving sequencer 211 selects "fault select groups" of seven bits at a time (for beats 1-9 in the example) from first block of data 201 over internal bus SEL7A(0-6) and transfers the seven selected bits over the seven nonfaulty signaling conductors of signaling bus 295. Receiving sequencer 251 then receives the seven bits per beat and transfers them to second block of data 250 over SEL7B (0-6). On a tenth beat (in the example), the last bit, bit 63 in the example, is selected and transmitted on a signaling conductor having no fault, and the last bit is stored in the correct bit of second block of data 250. FIGS. 8A and 8B show the eight beats and the data transmitted when no fault exists, and the ten beats and the bits transmitted during each beat when a fault does exist.

Figure 9:
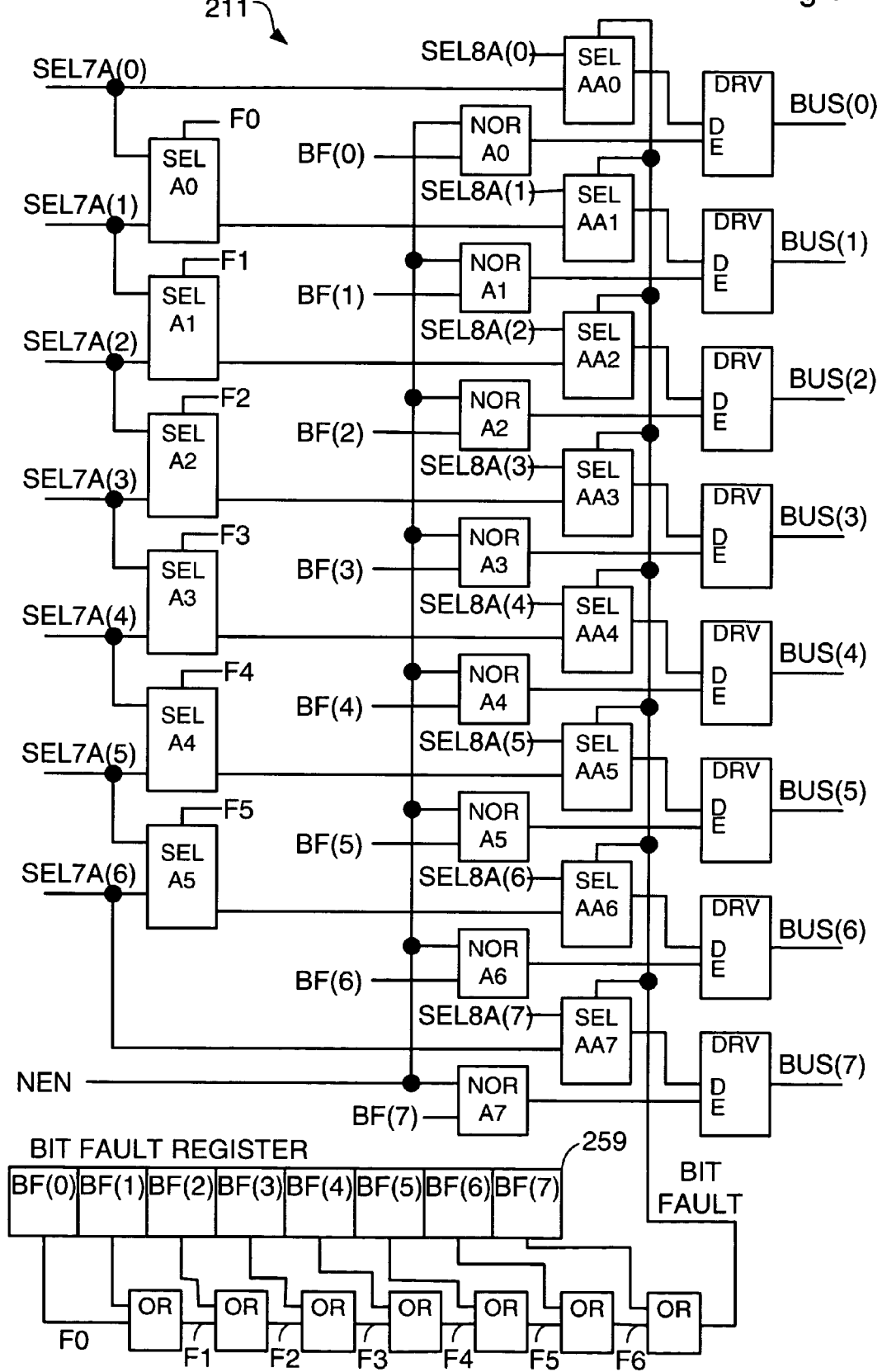
FIG. 9 shows a detailed block diagram of a driver control block depicted in FIG. 7.

FIG. 9 shows an exemplary embodiment of driving sequencer 211. A bit fault register 259 has eight bits, each bit corresponding to a signaling conductor in signaling bus 295. If a signaling conductor has a fault, the corresponding bit in bit fault register 259 is set to a logical "1"; otherwise the corresponding bit is set to a logical "0". BF(0)="1" therefore means that there is a fault on bit 0 of signaling bus 295. A cascade of OR gates produces a logical "1" beginning with the bit in bit fault register 259 having a logical "1". For example, if BF(3)="1", then F0, F1, F2 are "0", but F3, F4, F5, F6, and BIT FAULT are "1".

If BIT FAULT="1", a fault exists, and data transfer (in the example) will consist of ten beats, seven bits in each of the first nine beats, and one bit in the tenth beat.

Selectors AA0-AA7 select data from bus SEL8A(0-7) if BIT FAULT="0". If BIT FAULT="1", Selectors AA0-AA7 select data from SEL7A(0-6), although some or all such bits may be shifted as will now be described. Selectors A0-A5 provide a mechanism to shift all bits of SEL7A(0-6) to non-faulty signaling conductors.

For example, suppose BUS(0), which is the signaling conductor bit(0) of signaling bus 295, has been identified as having a fault (which could include the driver of BUS(0), the signaling conductor, and the receiver circuit). The driver of BUS(0) has an enable input, E, that disables the driver if input E is at a logical "0". When BUS(0) has a fault, BF(0)="1". BF(0) is an input to NOR A0; BF(0)="1" guarantees that the driver of BUS(0) is disabled. F0 controls selector A0; F0="1" selects SEL7A(0) in selector A0, which, through selector AA1, is coupled to the data input D of the driver of BUS(1). Similarly, SEL7A(1) is routed to input D of the driver of BUS(2); SEL7A(2) is routed to input D of the driver of BUS(3), and so forth. SEL7A(6) is routed directly to SELAA7 and driven on BUS(7). In this way, BUS(0) is bypassed and the seven bits of SEL7A are driven on nonfaulty signaling conductors BUS(1-7).

As a second example, but more briefly, if a fault exists on BUS(4), SEL7A(0) is routed and driven on BUS(0); SEL7A (1) is driven on BUS(1); SEL7A(2) is driven on BUS(2); SEL7A(3) is driven on BUS(3). SEL7A(4) is driven on BUS (5); SEL7A(5) is driven on BUS(6); SEL7A(6) is driven on BUS(7). The driver of BUS(4) is disabled by BF(4). Again, the seven bits of SEL7A are routed on nonfaulty signaling conductors.

Signaling bus 295 can be disabled entirely by asserting NEN="1", which is an asserting signal to NORs A0-A7, guaranteeing a logical "0" on enable inputs of all eight drivers. NEN is an optional signal used when a designer wants to be able to logically disable all drivers on signaling bus 295.

Those skilled in the art will appreciate that although for simplicity, the detailed logic shown supports but a single faulty signaling conductor, additional selection groups (e.g., "SEL6A", "SEL5A" for accommodation of two or three faulty signaling conductors, respectively) can be coupled to additional selectors to route fewer signal conductors at a time as "F" grows larger.

FIG. 10 shows an embodiment of receiving sequencer 251. A receive bit fault register 260 contains the same bit pattern as bit fault register 259, each bit corresponding to a signaling conductor in signaling bus 295. Bit fault register 260 is loaded from diagnostic unit 298 over signal 292. Again, a cascade of OR gates is provided as depicted to produce logical "1" including and following a logical "1" bit in receive bit fault register 260. For example, if RBF(0)="1", RF0, RF1, RF2, RF3, RF4, RF5, RF6, and RECEIVE BIT FAULT are all "1".

Receivers B0-B7 receive BUS(0-7) respectively, and output SEL8B(0-7), respectively. If a fault on a signaling conductor exists, only seven bits are being transmitted (on the seven nonfaulty signaling conductors) and the seven bits must be mapped properly from SEL8B(0-7) to SEL7B(0-6). This mapping effectively corresponds to the mapping done by driving sequencer 211 to steer seven bits to the seven nonfaulty signaling conductors of signaling bus 295.

RF0-RF7 and Selectors B0-B6 provide this mapping. If RBF(0)="1", (indicating a fault in signaling conductor bit "0" of signaling bus 295) RF0="1", and Selector B0 is controlled to select SEL8B(1) for output as SEL7B(0). Similarly, using signals RF1, RF2, RF3, RF4, RF5 and RF6, SEL8B(2) is driven onto SEL7B(1); SEL8B(3) is driven onto SEL7B(2); SEL8B(4) is driven onto SEL7B(3); SEL8B(5) is driven onto SEL7B(4); SEL8B(6) is driven onto SEL7B(5); and SEL8B(7) is driven onto SEL7B(6). Similarly, if BUS(6) is faulty, BUS(0-5) are routed to SEL7B(0-5), and BUS(7) is routed to SEL7B(6).

Additional selectors and ORs are used in an embodiment (not shown) designed to accommodate more than a single faulty signaling conductor, with the additional selectors used to route signals from nonfaulty signaling conductors to signaling groups having fewer signals coupled to second block of data 250. For example, if, as above, two faulty signals are accommodated in an embodiment, (using the naming convention above), a "SEL6B" set of signals as well as a SEL7B set of signals is required.

Figure 11:
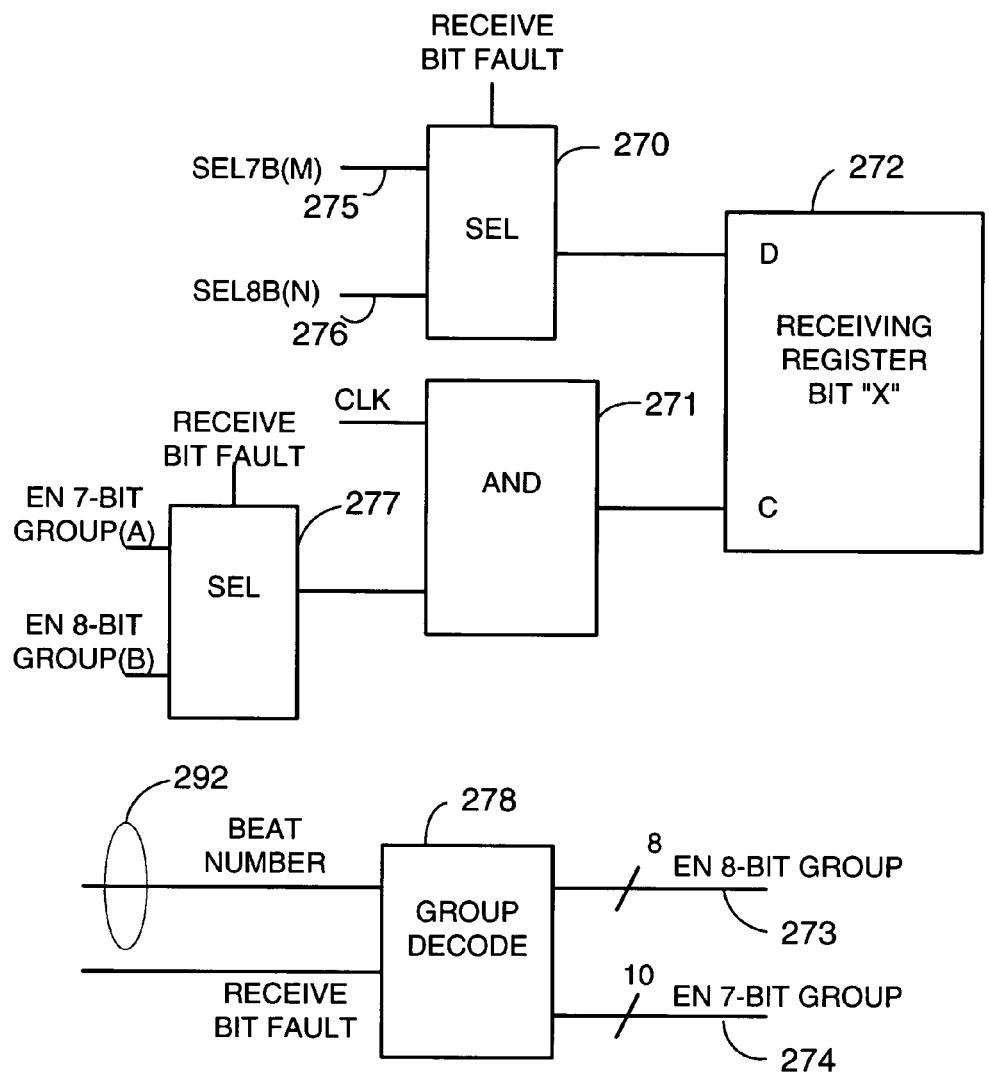
FIG. 11 shows a detailed block diagram of control logic that latches correct data into a particular bit of a receive register depicted in FIG. 7.

FIG. 11 shows an embodiment of detailed logic used to gate the appropriate bit received into the correct bit of receive register 250. Signal 292 from diagnostic unit 298 includes a beat number. In an alternative embodiment (not shown), receiving sequencer 251 does its own counting of beats. Group decode 278 uses the beat number and the receive bit fault (receive bit fault register 260 from FIG. 10) to produce an eight-bit "EN 8-BIT-GROUP" word, one bit of which is enabled for each beat, in order to control clocking of the eight bits in receiver register 250 that must receive data from SEL8B for a particular beat when no faults exist on signaling bus 295. Group decode 278 also outputs a 10-bit word, "EN 7-BIT GROUP", one bit of which is enabled for each of the ten beats that occur when a fault exists on a signaling conductor of signaling bus 295. A data input of register bit 272 (a particular bit "X" in receive register 250) is coupled to selector 270, which selects a bit, "M" of bus SEL7B when RECEIVE BIT FAULT="1", and selects a bit "N" of SEL8B when RECEIVE BIT FAULT="0". For example, SEL7B(0) is coupled to bits 0, 6,13, 55, and 64 of receive register 250. SEL7B(1) is coupled to bits 1, 7, 14 . . . 56. SEL8B(0) is coupled to bits 0, 7,15, 56.

AND gate 271 receives system clock CLK on a first input. A second input of AND 271 is coupled to selector 277 that is controlled by RECEIVE BIT FAULT, which is shown produced in FIG. 10. If a fault exists, RECEIVE BIT FAULT="1", and selector 277 will select "EN 7-BIT GROUP (A)", where "A" is the bit of the 10-bit word, "EN 7-BIT GROUP" 274 that applies to the particular 7-bit group of second block of data 250 that register bit 272 is in. For example, bits 0-6 of second block of data 250 is in the group of bits that the 7 bits transferred by beat 1 sends, and bit 0 of EN 7-BIT GROUP will be "1" during the first beat to enable the clock to those seven registers bits. Note that (in the example) only one register bit (i.e., bit 63) of receiver register 250 is affected when the bit in "EN 7-BIT GROUP" for the tenth beat is "1".

As discussed above, in an embodiment, additional faulty signaling conductors are accommodated. For example, if two faulty signaling conductors are to be accommodated, group decode 278 must enable six-bit groups as well as seven-bit groups and eight-bit groups. Selector 270 must have another input for the appropriate "SEL6B" bit, and selector 277 must accommodate a third input for an appropriate "EN 6-BIT GROUP" bit, as will be appreciated by those skilled in the art.

Figure 12:
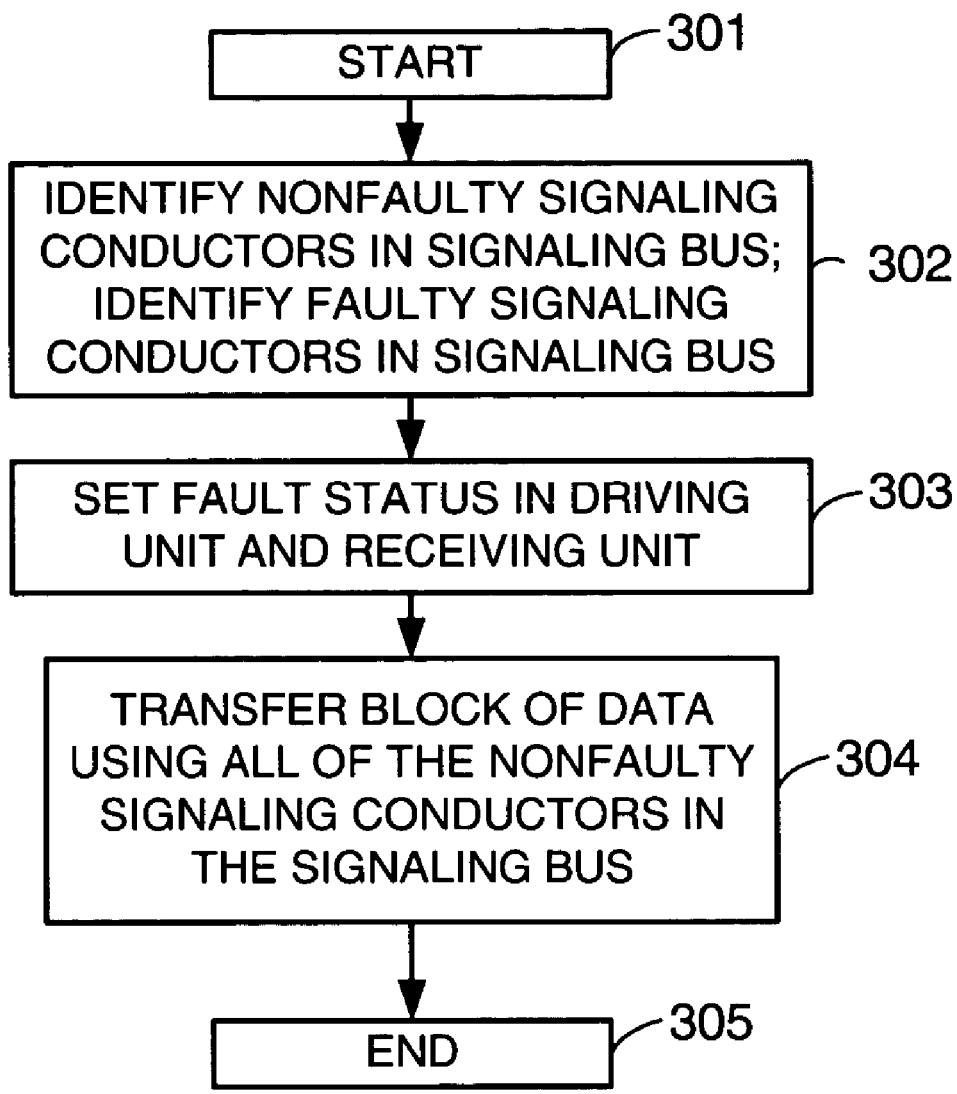
FIG. 12 is a high-level flow chart of the method disclosed in the present invention.

FIG. 12 shows a high level flow chart of a transmission sequence method 300 that allows transfer of a block of data from a first electronic unit to a second electronic unit over a signaling bus, the signaling bus may have a faulty signaling conductor. Block 301 begins the method. In block 302, a diagnostic unit determines faulty and nonfaulty signaling conductors in the signaling bus. The first electronic unit transfers a first block of data to the second electronic unit via the signaling bus, using a transmission sequence that utilizes all of the nonfaulty signaling conductors, using a minimum number of beats. The first electronic unit must transmit a "J" bit block of data to the second electronic unit of the "K" bit signaling bus. "F" is the number of faulty signaling conductors identified by the diagnostic unit. If "F"=0, no faults have been identified. Any number of faults up to "K-1" is contemplated by the invention. In block 303, the diagnostic unit sets fault status in the first (driving) electronic unit and in the second (receiving) electronic unit. In block 304, the "J" bit block of data is transmitted over the nonfaulty signaling conductors in the signaling bus, using enough bus cycles (beats) to complete the transfer. The second electronic unit receives the "J" bit block of data over the nonfaulty signaling conductor. Block 305 ends the method. Advantageously, drivers coupled to faulty signaling conductors are disabled.

Figure 13:
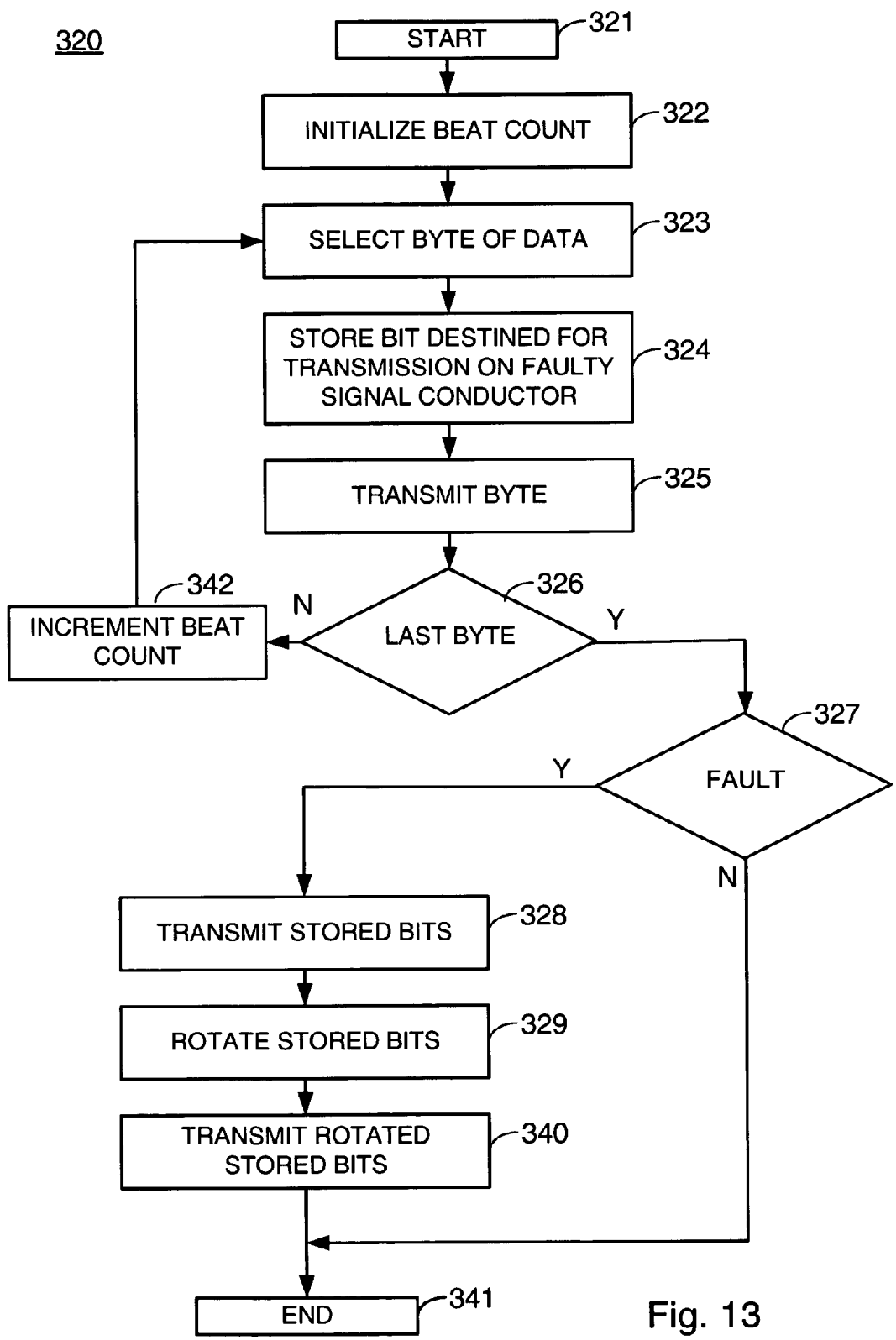
FIG. 13 is a flow chart showing a detailed expansion of block 304 of the flow chart of FIG. 12.

FIG. 13 shows a flow chart of a method 320, which is an embodiment of block 304 of method 300. Block 321 begins the method. In block 322 a beat count is initialized. In block 323 a byte of data is selected. The number of bits selected is the number of total signaling conductors in the signaling bus over which the block of data is to be transferred, and "byte" is used for exemplary purposes here, assuming a one byte wide signaling bus. For exemplary purposes, a 64-bit block of data is assumed, but the invention is not limited to a 64-bit block of data. For simplicity, a single faulty signaling conductor is assumed, but any number of faulty bits up to "K-1" is assumed, as explained above. In block 324, the bit of the selected byte that is destined for transmission over the faulty signaling conductor is stored. Advantageously, the bit is stored in a shift register, and the shift register can have its bits rotated respondent to a control signal. In block 325 the selected byte is routed to data inputs of drivers and driven over the signaling bus. The faulty signaling conductor is unable to transmit the bit routed to the data input of the driver coupled to the faulty signaling conductor, and, advantageously, that driver is disabled (also known as tristated, or switched to a high impedance state) to prevent possible high current from flowing in the event that the fault is a short circuit. "High impedance", in the case of a driver being disabled, means the driver's output is at least an order of magnitude higher impedance than the transmission line being driven, and is usually hundreds of thousands of ohms or even megohms. In block 326 a check is made to see if the number of beats required for a normal (no faulty signaling conductors) transmission has been completed. If not, the beat count is incremented by block 342, and control passes to block 323. If the normal beat count has been reached, block 327 checks whether a fault has been identified. If not, the transmission has been completed. If a fault has been identified, block 328 selects the byte of stored bits (in the example, a 64-bit block of data is to be transmitted over an 8-bit bus, and a single fault is assumed, resulting in eight stored bits) and routes them to the data input of the drivers of the signaling bus. Seven of the eight bits are transmitted on another beat, as explained above. Block 329 rotates the bits in the stored data so that all bits are moved to a different, predetermined position. As explained earlier, advantageously the stored bits are in a shift register capable of a bit rotation where all bits are moved one position, with the bit on one end being rotated to the first bit position on the other end. In block 340, the stored bits are again selected and routed to the data inputs of the drivers on the signaling bus and driven on a final beat. The bit that was unable to be transmitted on the previous bus beat is now directed to a different driver and is successfully driven over a nonfaulty signaling conductor. The second (receiving) electronic unit is aware of the faulty signaling conductor, and is designed knowing the transmission protocol used when a faulty signaling conductor exists, and is capable of properly moving the bits transmitted into the correct bit positions of a memory in the second electronic unit.

Figure 14:
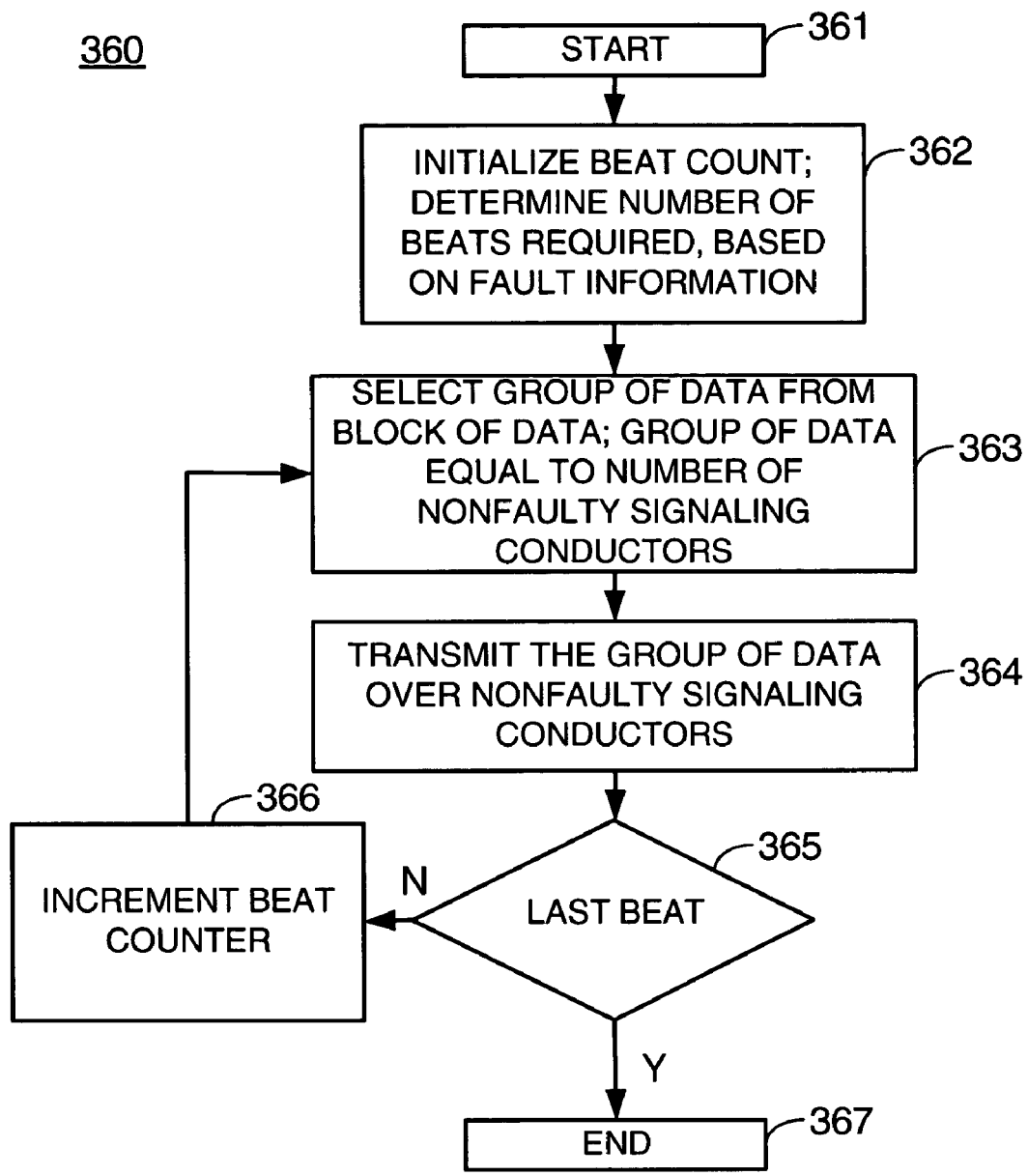
FIG. 14 is a flow chart showing a detailed alternative expansion of block 304 of the flow chart of FIG. 12.

FIG. 14 shows a second embodiment of block 304 of FIG. 12. Block 361 begins the method of transferring a block of data from a first electronic unit to a second electronic unit over a signaling bus. In block 362, a beat count is initialized, and the number of beats required is determined from the total number of bits to be transferred and the number of nonfaulty signaling conductors available in the signaling bus. In block 363, a group of data from the block to be transferred is selected, the size of the group being equal to the number of nonfaulty signaling conductors in the signaling bus. In block 364, the group of data selected are transmitted by the first electronic unit over the nonfaulty signaling conductors to the second electronic unit. Block 365 determines if the last beat has been completed; if not, block 366 increments a beat counter and control passes to block 363. If the last beat has been completed, control passes to block 367 which completes the method.

While the foregoing is directed to embodiments of the present invention, other and further embodiments of the invention may be devised without departing from the basic scope thereof, and the scope thereof is determined by the claims that follow.

What is claimed is:

1. A method for transmitting a "J" bit block of data from a first electronic unit to a second electronic unit over a signaling bus having "K" signaling conductors, where zero to "K-1" of the signaling conductors is faulty, the method comprising the steps of:
identifying faulty and nonfaulty signaling conductors in the signaling bus;
setting a fault status of the signaling conductors in the first electronic unit and in the second electronic unit, using information found by the step of identifying faulty and nonfaulty signaling conductors in the signaling bus;
determining "F", the number of faulty signaling conductors in the signaling bus;
determining "K-F", the number of nonfaulty signaling conductors in the signaling bus; and
transmitting the "J" bit block of data over the "K-F" nonfaulty signaling conductors using "J/(K-F)" beats, plus an additional beat if a remainder exists;
the step of transmitting further comprises the steps of:
selecting a "K" bit group of data from the "J" bit block of data;
transmitting, on a beat, "K-F" bits of the "K" bit group of data, using the "K-F" nonfaulty conductors;
storing the "F" bits in the "K" bit group that cannot be transmitted, on the beat, due to the "F" faulty conductors in the signaling bus;
repeating the above three steps until all "J" bits of the "J" bit block of data have been selected; and
transmitting the stored "F" bits on one or more additional beats, using one or more of the "K-F" nonfaulty signaling conductors;
the step of storing the "F" bits further comprising the step of shifting at least one bit of the "F" bits into a first end of a shift register; and
transmitting at least one of the bits of the shift register to a nonfaulty signaling conductor.

2. The method of claim 1, further comprising the step of moving a particular bit in the shift register to align that particular bit for coupling to a nonfaulty signaling conductor.

3. The method of claim 1, further comprising the steps of:
storing, in the second electronic unit, "K-F" bits per beat for "J/(K-F)" beats; and storing remainder bits in an additional beat, if "J/(K-F)" results in a remainder.

4. The method of claim 1, further comprising the steps of:
selecting a "K-F" bit group of bits from the "J" bit block of data on the first electronic unit;
transmitting the "K-F" bit group of bits from the first electronic unit to the second electronic unit using the "K-F" nonfaulty signaling conductors in the signaling bus, using a beat of the signaling bus;
repeating the previous steps until all "K-F" bit groups have been transmitted; and
transmitting any remaining bits of the "J" bit block of data on the first electronic unit to the second electronic unit using some or all of the "K-F" nonfaulty signaling conductors, using an additional beat of the signaling bus.

5. An apparatus for transmitting a "J" bit block of data from a first electronic unit to a second electronic unit comprising:
a first block of data in the first electronic unit holding "J" bits for transmission;
storage in the second electronic capable of holding a second block of data having "J" bits;
a signaling bus having "K" signaling conductors coupling the first electronic unit to the second electronic unit, "K" greater than one, the signaling bus having one (1) faulty signaling conductors and "K-1" nonfaulty signaling conductors;
a diagnostic unit coupled to the first electronic unit and to the second electronic unit capable of identifying the "1" faulty signaling conductors and the "K-1" nonfaulty signaling conductors on the signaling bus and storing fault identification information in the first electronic unit and in the second electronic unit;
a driving sequencer in the first electronic unit that, respondent to the fault identification information, transmits the "J" bits of data using "J/(K-1)" beats, plus an additional beat if a remainder exists, using only the "K-1" nonfaulty conductors;
a shift register having "K" bits, configured to receive, during each beat, at a first end of the shift register, a bit directed to the faulty signaling conductor, the shift register, when full, configured to be rotated for a first rotation, during which first rotation, a bit at a second end of the shift register is received at the first end of the shift register;
the apparatus configured to, following the first rotation, transmit K-1 bits of the shift register onto the nonfaulty signaling conductors;
the shift register further configured to be rotated for a second rotation, during which second rotation, a bit at the second end of the shift register is received at the first end of the shift register;
the apparatus configured to, following the second rotation, transmit the remaining untransmitted bit of the "J" bits on a nonfaulty signaling conductor.

* * * * *